March 26, 1929.  H. J. OSBORNE ET AL  1,706,409
MEANS FOR DISINFECTING WATER CLOSET SEATS
Filed May 21, 1928  2 Sheets-Sheet 2
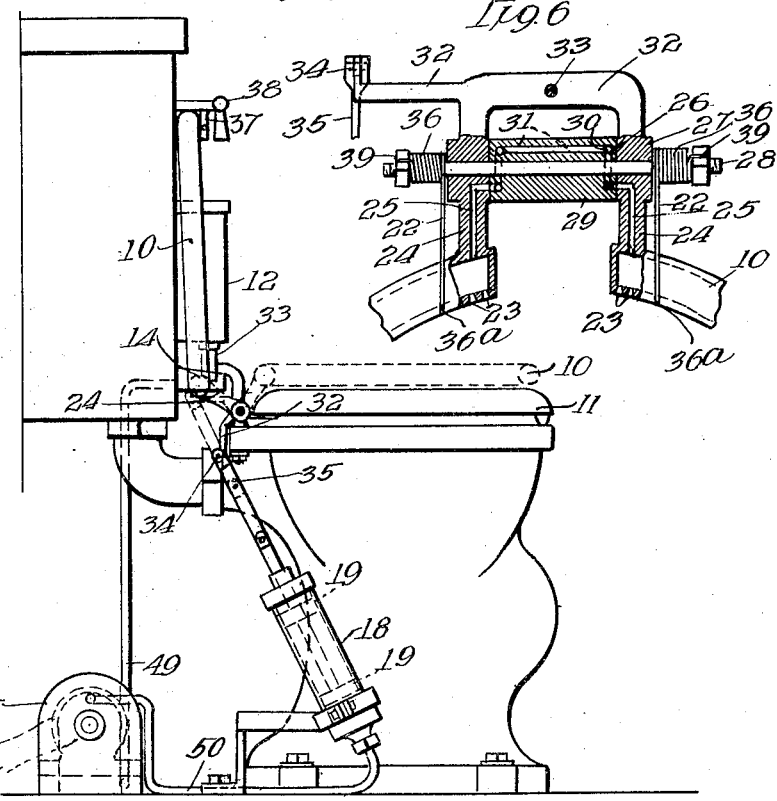
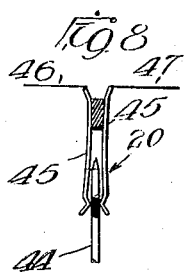
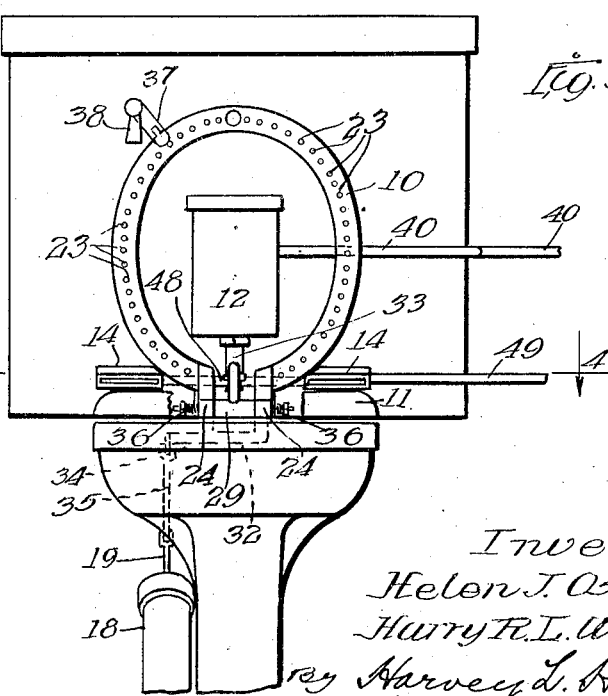
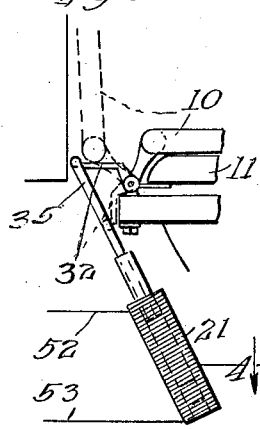
Inventors
Helen J. Osborne
Harry R. L. White.
By Harvey L. Hanson
Attorney.

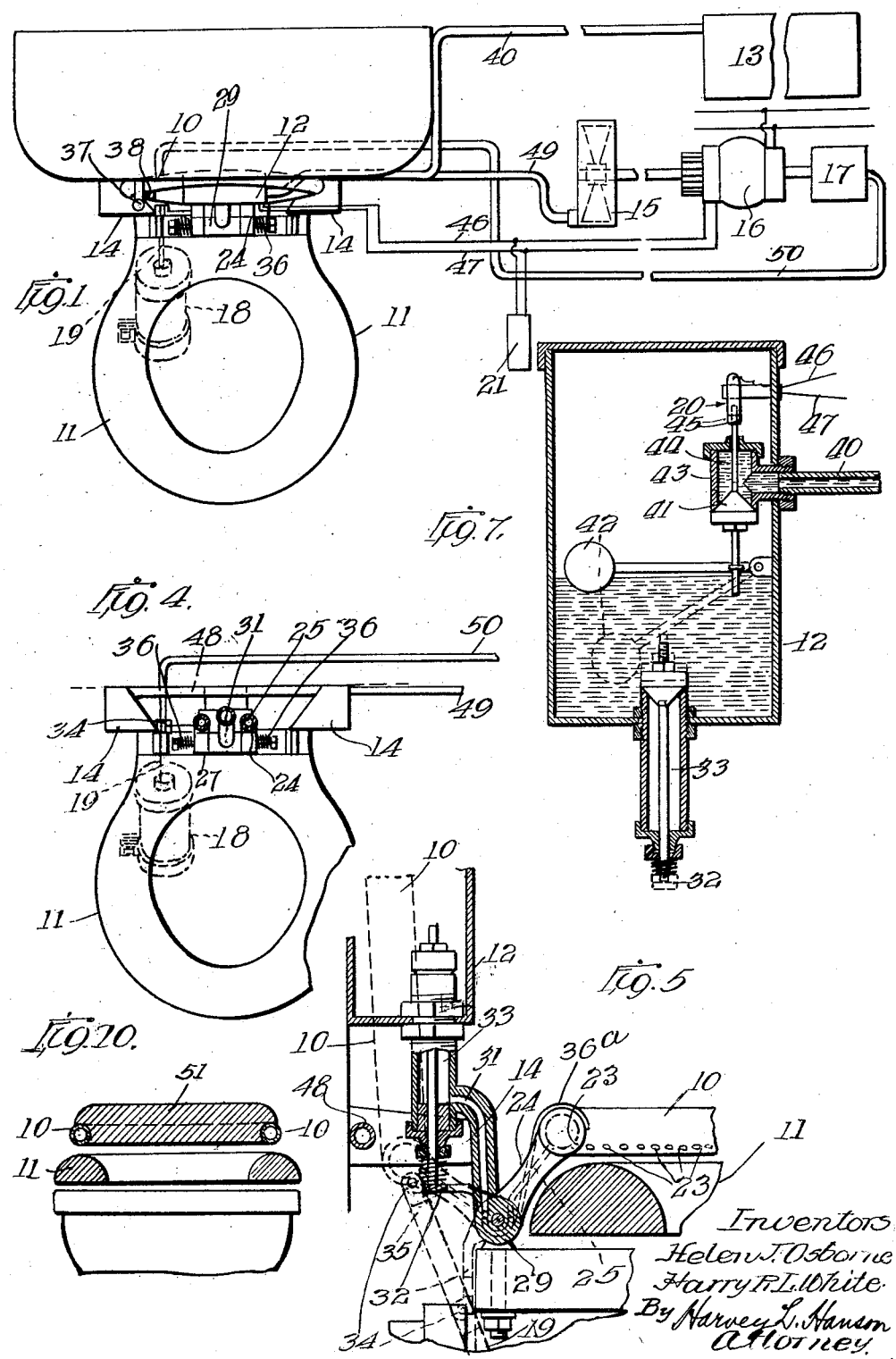

Patented Mar. 26, 1929.

1,706,409

UNITED STATES PATENT OFFICE.

HELEN J. OSBORNE, OF LEXINGTON, KENTUCKY, AND HARRY R. L. WHITE, OF MAYWOOD, ILLINOIS; SAID WHITE ASSIGNOR TO SAID OSBORNE.

MEANS FOR DISINFECTING WATER-CLOSET SEATS.

Application filed May 21, 1928. Serial No. 279,419.

The invention relates to a means for disinfecting water closet seats and has among its objects the provision of a construction whereby a suitable amount of liquid disinfectant or antiseptic material is applied to the seat, and provision of means for drying the disinfectant or antiseptic material.

The invention has as a further object the provision of a disinfectant spraying ring which is adapted to be arranged relatively to the seat, so that disinfectant may be applied to or sprayed upon the seat, means for raising the spraying ring relatively to the seat and means for applying air to the seat to thereby cause the disinfectant to be dried.

An additional object is to employ means which will cause the disinfectant spraying ring to be automatically lowered from a raised position upon operation of the handle and mechanism for controlling the flushing of the bowl of the water closet, and to combine with said means for causing the automatic lowering of the spraying ring a means for elevating the spraying ring out of the way to permit use of the water closet seat.

It is also an object of the invention to provide mechanism whereby, when the spraying ring is arranged in a lowered position, a valve controlled disinfectant reservoir is operated to allow the escape of the disinfectant therefrom to the spraying ring.

It is also an object to provide means for controlling the supply of disinfectant fed to the reservoir and to also associate an electric switch with said means which switch is operable to close a circiut after the disinfectant has been discharged from the reservoir, to cause the operation of an electric motor which has a blower or fan connected for operation thereby, the blower causing air to be applied to the seat to dry it.

Another object is to employ a vacuum pump, which is operable by said motor, and to connect said pump with means for raising the spraying ring whereby disinfectant is applied to the seat.

The invention has these and other objects all of which will be explained in detail and more readily understood when read in conjunction with the accompanying drawings, it being obvious that changes and modifications may be made without departing from the spirit of the appended claims forming a part hereof.

In the drawings:

Figure 1 is a top plan view illustrating a water closet seat, a water reservoir for the bowl, the spraying ring whereby the disinfectant is applied and distributed, which is shown elevated relatively to the seat, also illustrating the reservoirs from which disinfectant is fed to the spraying ring, and in addition, shows a vacuum pump, a fan and a motor for operating the pump and fan.

Figure 2 is an end view of the structure shown in Figure 1 showing a pneumatic means employing a piston and cylinder mechanism which is combined with the pump for causing the spraying ring for applying disinfectant to the seat to be raised relatively to the seat.

Figure 3 is a front view of the structure shown in Figure 2.

Figure 4 is a plan sectional view, taken on line 4—4 of Figure 3.

Figure 5 is a view showing certain elements of the structure in section.

Figure 6 is a plan view showing certain elements of the structure having fluid passages whereby disinfecting fluid is fed to the distributing element or spray ring whereby said fluid is applied to the seat.

Figure 7 is a sectional view of an auxiliary reservoir for supplying disinfectant to the distributing element.

Figure 8 is a detail view of an electric switch arranged in the auxiliary reservoir illustrated in Figure 7.

Figure 9 is a view illustrating a solenoid which may be employed in lieu of the pneumatic means for causing the raising of the disinfectant distributing ring.

Figure 10 is a sectional view showing a modified arrangement wherein the distributing spray ring has a lid or cover for the bowl secured to it.

The structure illustrated in the drawings embodies a disinfectant or antiseptic distributing spraying ring 10 which is designed to be lowered relatively to the water closet seat 11 and thereby cause it to assume a position over the seat to apply, spray or distribute disinfectant to the seat. This spraying ring 10 has combined therewith a means which is operable to cause the ring to be raised relatively to the seat after disinfectant has been applied to the seat to thereby expose the seat for use. The distributing spraying ring 10 is connected with an auxiliary reservoir 12 in which disinfectant is contained and which in turn is connected with a main disinfectant reservoir 13.

Provision is made through means including the air nozzles 14, 14 for directing a current of air to and upon the seat to dry the latter after the application of the disinfectant to the seat, the air current being created through the medium of the fan or blower 15 which is operated by means of the electric motor 16.

The motor 16, in the present construction, is employed to also actuate a vacuum pump 17 which is connected with the vacuum piston cylinder 18 having the piston 19 the latter being connected with the disinfectant distributing ring 10 to cause it to be elevated after the disinfectant is applied to the seat.

Provision is made through the medium of an electric switch 20, which is operable after the disinfectant has been applied to the seat, to cause the operation of the electric motor and the actuation of the blower 15 to dry the seat and simultaneously cause the spraying ring 10 to be elevated from its lower position over the seat through the medium of the piston 19 and the piston cylinder 18 which, as before stated, is associated with the vacuum pump 17.

It may be here stated that the raising of the spraying ring 10 from its lowered position over the seat may, if so desired, be accomplished electrically; as for instance, through the use of a solenoid 21 instead of the piston 19 and cylinder 18 and the pump 17. When an electrical structure is preferred the solenoid may be connected in circuit with the motor so that it will be operated upon actuation of the motor.

A spring mechanism, generally designated 22, is employed for causing the lowering of the disinfectant distributing ring 10, the end portions of the springs being suitably secured to the ring. This lowering of the distributing ring 10 may be controlled by means of a catch which is released when operating the mechanism for flushing the bowl.

The disinfectant distributor 10 is of a hollow tubular and annular character having the perforations 23 which are provided therein to direct the disinfectant toward and upon the seat when the ring is in a lowered position relatively to the seat. The ring 10 is provided with a plurality of laterally and downwardly projecting bracket arms 24, 24 each of which is provided with a passage 25 which terminates in a connection with the annular passage 26 provided in the enlargements 27 of said arms.

The brackets including the arms 24, 24 are journaled upon the shaft 28 which is mounted in the member 29 which member provides a connection with the toilet bowl and a support for said bracket arms and distributing ring 10. The member 29 is provided with a plurality of fluid passages, designated 30, which respectively communicate with the annular fluid passages 26 of said bracket arms, and in turn communicate with the fluid passage 31 which provides a communicating passage between the auxiliary disinfectant containing tank or reservoir 12, the passages 25, 25 in said arms and the distributing member 10.

The bracket arms 24, 24 of the spraying ring 10 are provided with an extension 32 which provides a lever and a means for engaging the stem of the valve 33 to actuate and open the valve and allow the disinfectant to flow from the auxiliary reservoir 12 through said valve 33, passages 31, 30 and 25, 25 and into the distributing ring 10 when the ring 10 is arranged in a lowered position.

The extension or lever 32 has a link 35 connected therewith at 34 which link in turn is connected to the piston 19 of the piston cylinder 18 and therefore, as the piston is actuated by the reduced air condition created by the vacuum pump 17, movement of the piston actuates the lever 32 and causes the distributing ring 10 to be elevated relatively to the seat of the toilet bowl.

Upon elevation of the distributing ring 10 the coiled spring extensions 36 of the spring mechanisms 22, which are mounted upon the shaft 28, are put under tension so that they may act to lower the distributing ring 10 upon release of the catch 37 which is operated upon manipulation of the lever or handle 38 which controls the operation of the flushing mechanism located in the flushing tank. These springs 36 have one end secured to the shaft 28 by means of the spring locking members 39, 39 and have the opposite end portions thereof 36$^a$ extended laterally from the shaft into engagement with the distributing ring 10. The end portions 36$^a$ of the springs are arranged relatively to the ring, so that when the ring is elevated by the actuation of the piston 19, these springs are put under tension; thus, upon actuation of the handle 38, which handle controls the operation of the mechanism employed for controlling the flushing of the toilet bowl, the ring 10 is lowered by the action of the springs. It will be noted that lowering of the ring 10 is controlled through the medium of the piston 19 and the cylinder 18 which will cushion the ring 10 upon its descent.

The handle mechanism 38 is provided with the catch 37 which engages the ring 10 and releasably locks the latter in an elevated position when brought to this position by the actuation of the piston 19 and cylinder 18 connected with the lever connected with the distributing ring.

The auxiliary disinfectant tank 12 is supplied with disinfectant from a main reservoir 13 through means of the pipe connection 40. Flow of the disinfectant from the reservoir 13 through the pipe 40 to the auxiliary tank 12 is controlled by means of the valve 41 having a float 42 connected to the stem thereof. The valve 41 is arranged in the valve casing 43. This valve 41 and the float 42 connected with said valve provide a means for controlling the electric switch 20 which is connected in circuit with the motor 16 to control the operation of the latter to cause the application of air to the seat through said jets or nozzles 14, and to also control the raising of the distributing ring 10 after the ring 10 has been lowered.

Upon release of the catch 37 through manipulation of the handle 38, the distributor 10 is released and due to the action of the springs 36 upon said ring, said ring is lowered bringing the lever 32 up into engagement with the stem of the valve 33. This causes the disinfectant in the auxiliary tank 12 to discharge therefrom through the passages 31, 26 and 25 to the ring 10, the apertures 23 in said ring 10 to the seat 11.

It will also be evident that after the charge of fluid in the auxiliary reservoir 12 has been discharged therefrom, the float 42 is lowered, which opens the valve 41 and draws the contact element 44 from between the spring fingers 45, 45 of the switch 20 which controls the motor 16. The spring contact fingers 45, 45 are connected with the conductors 46 and 47 which lead to and connect with the motor 16.

Withdrawal of the contact element 44 from between the spring fingers 45 of the switch causes direct contact between said fingers closing and completing the circuit with the motor causing it to be actuated. This causes the fan 15 and the vacuum pump 17 to be actuated which causes a reduced air condition to exist in the cylinder 18 and causes the ring 10 to be elevated closing the valve 33 simultaneously and causes air to be applied to the seat to dry the latter of the disinfectant.

Since the float 42 is at this time lowered, the switch 20 is closed and remains in this condition until the auxiliary reservoir is again charged. When said reservoir is again filled, the float 42 closes the valve 41 and causes the contact element 44 to again enter between the spring fingers 45, 45 of the switch 20 breaking the circuit to the motor which brings the device to a rest with the distributing ring 10 in an elevated position and the seat dried by the application of air through the jets or nozzles 14, 14 which are arranged in rear and a suitable distance above the upper face of the seat.

The nozzles or air outlets 14, 14, which as before stated are arranged at the rear of the seat and in substantial horizontal alignment with the face of the seat upon opposite sides thereof, are connected together by the pipe connection 48. This structure is connected by means of the pipe 49 in any suitable manner with the fan 15, and thus air will be fed to the seat to dry it.

The pipe connection 50 leads from the vacuum pump 17 to the cylinder 18 and thus the air therein will be drawn therefrom upon the operation of the motor producing a reduced air condition in the cylinder 18, which acts upon the piston 19 causing the piston 19 to be drawn along said cylinder, and by virtue of the fact that the piston is connected with the lever 32 the distributing ring 10 is raised relatively to the seat. The piston and cylinder which cause the ring to be elevated will also act to cushion the ring when lowered by said springs 36.

The distributing ring 10 and the cover or lid 51 for the toilet bowl may be secured together as shown in Figure 10 if this should be found desirable.

A solenoid, such as 21 and shown in Figure 9, may be substituted for the piston 19 and cylinder 18 hereinbefore referred to. When a structure such as this is desired, a connection of the conductors 52 and 53 leading from the windings of the solenoid will be made with the conductors 46 and 47 leading to the motor and to the switch, generally designated 20. This will also cause the ring to be elevated upon closing of the switch 20.

From the foregoing description of the construction and operation of the device, it is evident that a construction is provided whereby upon flushing of the bowl, the ring 10 is released and caused to assume a lowered position, or a position upon the seat, and that when the ring assumes this position the extension or lever 32 engages the stem of the valve 33 and opens said valve permitting fluid contained in said auxiliary tank 12 to flow therefrom through the passages 31, 25 and into and from the ring 10.

It is further evident that as the fluid in said auxiliary reservoir 12 is lowered, the float 42 is also lowered, which opens the valve 41 and also removes the insulated extension 44 of said valve from between the contact springs 45, 45 of the switch 20 closing the circuit to the motor 16. When the circuit to the motor is closed, the fan 15 is actuated to supply air to the seat and the vacuum pump 17 is also actuated which operates the piston in the cylinder 18. This movement of the piston causes the ring 10 to be raised against the action of the springs 36 and air applied to dry the seat during and for a suitable period after the raising of the distributing ring. Suitable timing mechanism connected with the motor is used to fix the amount of time the fan shall operate.

When the ring 10 is moved upwardly away from the seat, the lever 32 and the stem of the valve 33 become disengaged from each other which allows the valve 33 to seat, shutting off the flow of disinfectant to the seat. As the auxiliary reservoir becomes filled or charged the float 42 is raised, which raises and closes valve 41 and causes the insulated extension 44 to enter between the contact fingers 45, 45 of the switch 20, which breaks the circuit to the motor and brings these elements to a rest.

Having thus described the invention, what we claim and desire to secure by Letters Patent is:

1. In a device of the class described, the combination of an element for delivering disinfectant to the seat of a water closet bowl, a support for said element connecting said element relatively to the bowl, said support allowing said element to be raised and lowered relatively to said seat, a reservoir for supplying disinfectant to said element, means for controlling the discharge of disinfectant from said reservoir to said element, said controlling means being engageable by said element when said element is lowered, means for raising said element, means for applying air to said seat to dry said seat, said controlling means preventing the discharge of disinfectant from said reservoir to said element when said element is raised.

2. In a device of the class described, the combination of an element for delivering disinfectant to the seat of a water closet bowl, a support for said element, said support permitting said element to be raised and lowered relatively to said seat, means for supplying disinfectant to said element when said element is lowered, means for controlling the supply of disinfectant from said first mentioned means to said element, said last mentioned means including a member engageable by said element when said element is lowered, means for raising said element, and a member controlled by the lever of the disinfectant in said first mentioned means for causing the raising means for said element to be actuated and the feeding of disinfectant to said element to be arrested.

3. In a device of the class described, the combination of an element for delivering disinfectant to the seat of a water closet bowl, a support for said element, said support permitting said element to be raised and lowered relatively to said seat, means for supplying disinfectant to said element and means for delivering air to said seat, means for controlling the discharge of disinfectant from said first mentioned means to said element, said last mentioned means including a member engageable by said element when said element is lowered, means for raising said element and a member controlled by the level of the disinfectant in said first mentioned means for causing the raising means for said element and the means for feeding air to said seat to be arrested.

4. In a device of the character described, the combination of an element for delivering disinfectant to the seat of a water closet bowl, a support for said element permitting said element to be raised and lowered relatively to said seat, a reservoir for the disinfectant, a valve controlling the escape of disinfectant from said reservoir, a member projecting from said element for engaging said valve to open said valve when the element is lowered, a valve controlling the flow of disinfectant to said reservoir, means operable by the liquid level in said reservoir for controlling said last mentioned valve, means for applying air to said seat to dry said seat, means for raising said element and means controlled by the said last mentioned valve for causing the operation of said raising means and the operation of the means for applying air to said seat.

5. In a device of the character described, the combination of an element for delivering disinfectant to the seat of a water closet bowl, a support for said element permitting said element to be raised and lowered relatively to said seat, a reservoir for the disinfectant, a valve controlling the escape of disinfectant from said reservoir, a member projecting from said element for engaging said valve to open said valve when said element is lowered, a valve controlling the flow of disinfectant to said reservoir, means operable by the liquid level in said reservoir for controlling said last mentioned valve, means for applying air to said seat to dry said seat, means for raising said element and a motor for actuating said means for applying air to the seat and actuating said means for raising said element.

6. In a device of the character described, the combination of an element for delivering disinfectant to the seat of a water closet bowl, a support for said element permitting said element to be raised and lowered relatively to said seat, a reservoir for the disinfectant, a valve controlling the escape of disinfectant from said reservoir, a member projecting from said element for engaging said valve to open said valve when said element is lowered, a valve controlling the flow of disinfectant to said reservoir, means operable by the liquid level in said reservoir for controlling said last mentioned valve, means for applying air to said seat to dry said seat, means for raising said element and a motor for actuating said means for applying air to the seat and actuating said means for raising said element, means for controlling the actuation of said motor, said last mentioned means being operable by the first mentioned means.

7. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, a motor for causing the actuation of both of said last mentioned means, and means controlled by the liquid level in said reservoir for controlling the operation of said motor.

8. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, a motor for causing the actuation of both of said last mentioned means, and an electric switch controlled by the liquid level in said reservoir for controlling the operation of said motor.

9. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, a motor for causing the actuation of both of said last mentioned means, means for releasably locking said element in a raised position, means for causing said element to be lowered, said locking means being operable to release said element when said bowl is flushed.

10. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, a motor for causing the actuation of said means for applying air to said seat and means controlled by the liquid level in said reservoir for controlling the operation of said motor.

11. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, a motor for causing the actuation of said means for raising said element, and liquid level controlled means in said reservoir for controlling the operation of said motor.

12. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, a motor for causing the actuation of said means for raising said element, and means controlled by the liquid level in said reservoir for controlling the operation of said motor, means for lowering said element, said means including a spring.

13. In a device of the class described, the combination of an element for delivering disinfectant to the seat of a water closet bowl, a support for said element permitting said element to be raised and lowered relatively to said seat, a reservoir for disinfectant, a fluid passage connecting said reservoir and element, a valve controlling said passage, said element having means for engaging and opening said valve when said element is lowered, means for applying air to said seat, means for raising said element, said means being connected to said means for engaging said valve, a motor for causing the actuation of both of said last mentioned means, and means controlled by the liquid level in said reservoir for controlling the operation of said motor.

14. In a device of the class described, the combination of a ring provided with apertures for the delivery of disinfectant to the seat of a water closet bowl, means for raising and lowering said ring relatively to said seat, a reservoir for supplying disinfectant to said ring, an extension secured to said ring, valve mechanism controlling the discharge of said disinfectant from said reservoir to said ring, said extension operating said valve mechanism when said ring is lowered, and piston means for raising said ring when not in use.

In witness whereof, we hereunto subscribe our names this 17th day of May, A. D. 1928.

HELEN J. OSBORNE.
HARRY R. L. WHITE.